United States Patent

Pan et al.

[11] Patent Number: 6,148,129
[45] Date of Patent: *Nov. 14, 2000

[54] BROAD BANDWIDTH, SINGLE MODE FIBER OPTIC COUPLER AND METHOD OF MANUFACTURE

[75] Inventors: Jing-Jong Pan, Milpitas; Donna Yu, Danville, both of Calif.

[73] Assignee: E-Tek Dynamics, Inc., San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/960,948

[22] Filed: Oct. 30, 1997

Related U.S. Application Data

[63] Continuation of application No. 08/670,991, Sep. 16, 1996, abandoned, which is a continuation of application No. 08/389,609, Feb. 15, 1995, abandoned, which is a continuation of application No. 08/004,043, Jan. 15, 1993, abandoned.

[51] Int. Cl.[7] ............................................. G02B 6/26
[52] U.S. Cl. .................................. 385/42; 385/43; 385/51
[58] Field of Search ................................. 385/42, 43, 50, 385/51

[56] References Cited

U.S. PATENT DOCUMENTS

| | | | |
|---|---|---|---|
| 4,264,126 | 4/1981 | Sheem | 385/51 X |
| 4,449,781 | 5/1984 | Lightstone et al. | 385/43 |
| 4,796,968 | 1/1989 | Coccoli et al. | 385/42 |
| 4,798,436 | 1/1989 | Mortimore | 350/96.15 |
| 4,801,185 | 1/1989 | Bricheno | 385/43 X |
| 4,906,068 | 3/1990 | Olson et al. | 385/43 |
| 4,997,247 | 3/1991 | Stowe | 385/50 |
| 5,058,979 | 10/1991 | Yamauchi et al. | 385/43 |
| 5,095,516 | 3/1992 | Sasaki et al. | 385/43 |
| 5,101,462 | 3/1992 | Sasaki et al. | 385/43 |
| 5,190,364 | 3/1993 | Imoto et al. | 385/15 X |
| 5,195,151 | 3/1993 | Campbell, Jr. et al. | 385/43 |

FOREIGN PATENT DOCUMENTS

0 174 014 A2  12/1986  European Pat. Off. .

*Primary Examiner*—Hemang Sanghavi
*Attorney, Agent, or Firm*—Townsend Townsend & Crew, LLP; Mark D. Barrish, Esq.

[57] ABSTRACT

The present invention provides for a fiber optic coupler of first and second optic fibers formed by a length of the two fibers. The first optic fiber along the length has a different core diameter than that of the second optic fiber. At the both ends of the length the first and second optic fibers are twisted about each other with a central portion in which said first and second optic fibers are fused substantially parallel to each other. The resulting coupler is such that an input light signal is split into output light signals in a predetermined power ratio on the two optic fibers with the coupled power ratio relatively insensitive for a predetermined range of signal wavelengths.

25 Claims, 8 Drawing Sheets

Peak Coupled Power Ratio as a Funciton of K for Fixed $\Delta\beta$

BROAD BANDWIDTH, SINGLE MODE FIBER OPTIC COUPLER AND METHOD OF MANUFACTURE

This is a continuation of U.S. Patent application Ser. No. 08/309,991, filed Sep. 16, 1996, now abandoned, which is a continuation of U.S. Patent application Ser. No. 08/670,609, filed Feb. 15, 1995, now abandoned, which is a continuation of U.S. Patent application Ser. No. 08/004,043, filed Jan. 15, 1993, now abandoned, the disclosures of which are incorporated herein by reference.

BACKGROUND OF THE INVENTION

The present invention is related to fiber optic technology and, more particularly, to fiber optic couplers for single-mode optic fibers.

Most fiber optic networks today use single-mode optical fibers over which an optical, i.e., light, signal is transmitted over a particular wavelength. Such networks typically have numerous couplers by which a signal on a single fiber is distributed to many fibers. In a typical coupler a single input fiber joins two output fibers to form a 1×2 coupler, or two input fibers join two output fibers to form a 2×2 coupler. Other combinations are possible.

It is highly desirable for all couplers that the distribution of the signal from an input fiber to the output fibers be substantially independent of the signal's wavelength. Semiconductor lasers which are used to generate the signals on the network are fairly noisy. Light signals which are no more precise than ±30 nm of a defined wavelength are typical. Thus the strength of a signal on an arbitrary branch of a fiber optic network may become unpredictable in a fiber optic network with couplers which are relatively wavelength dependent.

Unfortunately, present fiber optic couplers are still relatively wavelength dependent. For example, the coupled power ratio, i.e., the ratio of the power from an input fiber to an output fiber, in present fiber optic couplers might be 0.5 for optical signals at 1.3 µm and 1.5 µm, typical wavelengths for optical fiber signals. However, for signals above and below these two values, the coupling ratio of such couplers might vary widely.

One technique for improving the wavelength independence for a coupler is explained in some detail in an article entitled, "Wavelength-Flattened Fused Coupler," D. B. Mortimer, *Electronic Letters*, Vol. 21, pp. 742–743, 1985. In this technique two single-mode optical fibers, one of which is pretapered, are twisted together and fused for a 2×2 coupler. Each fiber, both untapered and pretapered, forms an input and output fiber for the coupler. This technique has been found to flatten the power coupling curve of a light signal from an input fiber to an output fiber over differing wavelengths.

Another technique for improving the wavelength independence of a coupler is to fuse untwisted sections, one untapered and one pretapered, of optical fibers together. The fused sections are held in parallel juxtaposition to each other. Such a technique is described in U.S. Pat. No. 4,798,438, which issued on Jan. 17, 1989 to D. Moore et al.

Nonetheless, it is still desirable that the wavelength response of a fiber optic coupler be improved for a high-performance fiber optic network. Furthermore, the described techniques have proved difficult to implement in manufacturing operations for fiber optic couplers which have predictable and reliably reproducible coupled power ratios. Without predictability and reproducibility in manufacturing, the costs in manufacturing couplers are increased and inhibit the implementation of fiber optic networks.

The present invention solves or substantially mitigates these problems with a fiber optic coupler which has a greatly improved wavelength independence. The coupler can be manufactured with predictable and reproducible power coupling ratios in comparison with previous techniques.

SUMMARY OF THE INVENTION

The present invention provides for a fiber optic coupler of first and second optic fibers formed by a length of the two fibers. The first optic fiber along the length has a different core diameter than that of said second optic fiber. At the both ends of the length the first and second optic fibers are twisted with a central portion in which said first and second optic fibers are fused substantially parallel to each other. The resulting coupler is such that an input light signal is split into output light signals in a predetermined power ratio on the two optic fibers with the coupled power ratio relatively insensitive for a predetermined range of signal wavelengths.

The present invention also provides for a method of manufacturing fiber optic couplers. Two optical fibers with mismatched core diameters are provided. The fibers are formed into two twists being separated by a substantially parallel section. The parallel section is heated to fuse said fibers and the fibers are pulled apart as the fibers are fused. When a predetermined coupled power ratio is reached, the heating and pulling is terminated. The resulting fiber optic coupler has a coupled power ratio relatively insensitive for a predetermined range of signal wavelengths.

DETAILED DESCRIPTION OF PREFERRED EMBODIMENT(S)

Present-day semiconductor lasers on fiber networks typically have their outputs centered around 1300 and 1550 nm wavelengths. The lasers do not operate precisely at these wavelengths and hence it is desirable that the coupled power ratio of any coupler in the network be substantially independent of the wavelength of the optical signals in the network.

Figure 1A:
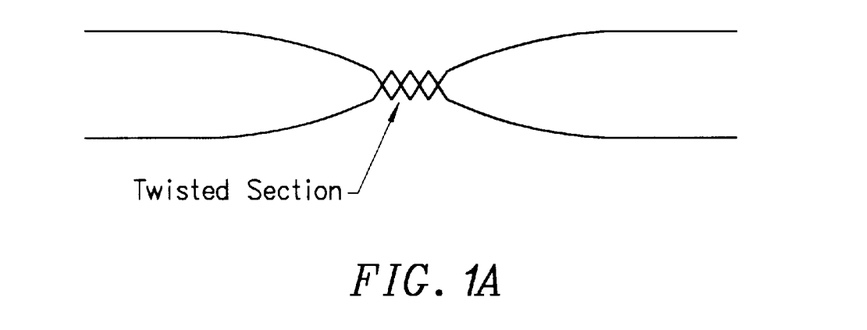
FIG. 1A is a representational diagram of a prior art fiber optic coupler in which the fibers are twisted together.
Figure 1B:
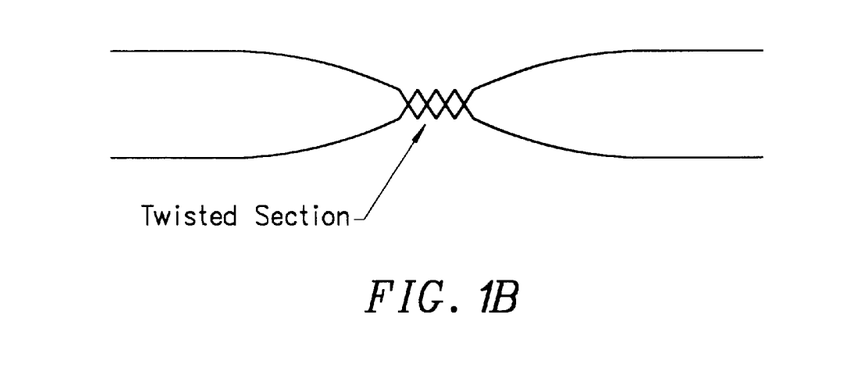
FIG. 1B is a representational diagram of a prior art coupler in which one of the fibers is pretapered and twisted.
Figure 1C:
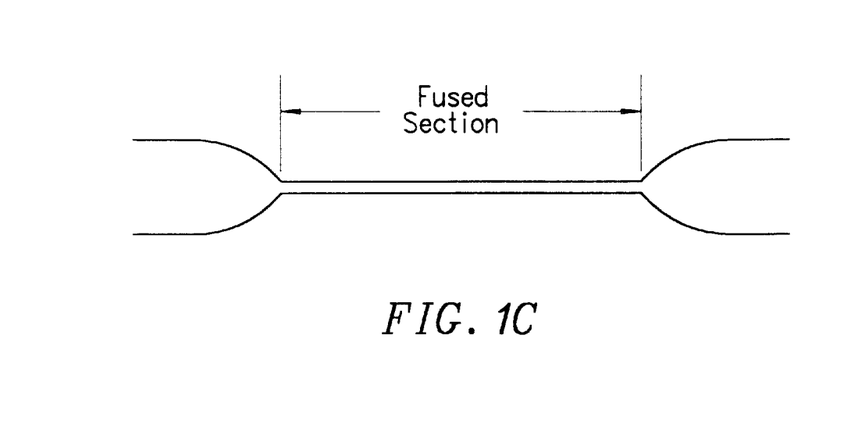
FIG. 1C is a representational diagram of another prior art coupler in which one of the fibers is pretapered.

FIGS. 1A–1C illustrate some of the different fiber optic couplers, 2×2 couplers in this case, found in the prior art. The coupler in FIG. 1A is a conventional fiber optic coupler in which the two single mode fibers (with their jackets removed) are twisted together and fused. This type of coupler is fairly dependent upon the wavelength of the optical signal.

FIG. 1B shows a fiber optic coupler with an improved wavelength independence over that of the conventional coupler. This broadband coupler is discussed in the Mortimer article mentioned above. It is formed by taking two identical optical fibers and pretapering one. In a pretapering operation, the fiber is heated and pulled so that the diameters of its core and cladding are reduced below nominal diameters. Such a fiber has a pretapered portion with a center section of substantially uniform, but reduced, diameter and two gradually tapered sections on either side of the central section in which the diameter of the fiber increases from the reduced diameter to the nominal diameter. As illustrated in FIG. 1B, the central section of the pretapered fiber is twisted about a portion of the second, untapered, fiber and fused by heat, as the ends of the fiber are pulled apart.

Another coupler with improved wavelength independence over the conventional coupler is depicted in FIG. 1C. In this type of broadband coupler, one of the optical fibers is pretapered also. However, instead of twisting the fibers together and fusing them, the reduced diameter section is placed in parallel juxtaposition with a section of an untapered fiber and fused.

Figure 2:
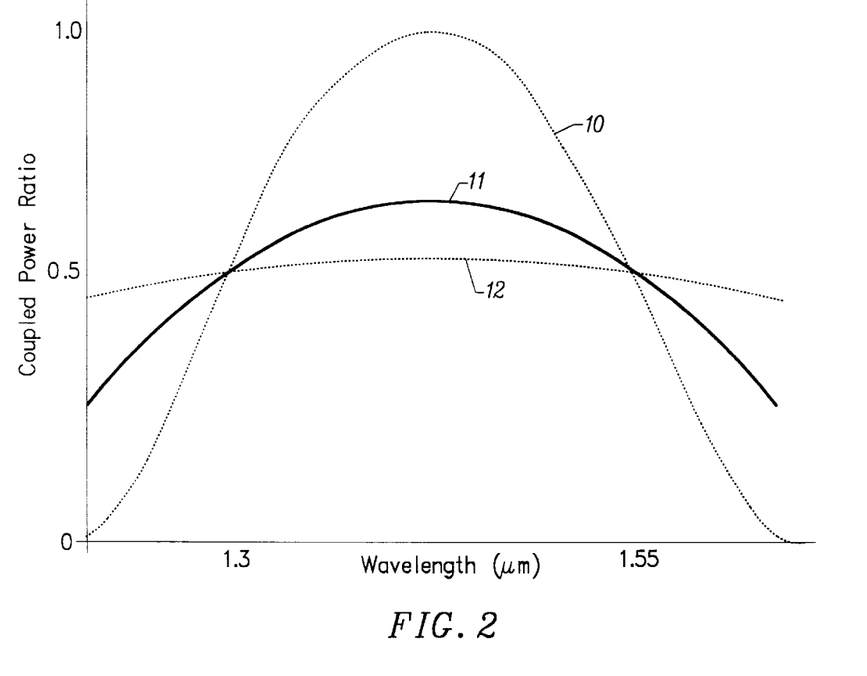
FIG. 2 is a representative graph of the coupled power ratio versus the wavelength for couplers illustrated in FIGS. 1A–1B and that of a coupler according to the present invention.

FIG. 2 illustrates the relative wavelength dependence of present fiber optic couplers and that of the present invention. The coupled power ratio is the amount of power of a light signal in one of the optical fibers travelling toward the coupler to the power of the optical signal in one of the optical fibers travelling away from the coupler. Here it is assumed that a 0.5 coupled power ratio is desirable, i.e., the input signal should be split evenly by the coupler into two output signals on two fibers, and that the wavelengths of the signals are at 1.3 $\mu$m (1300 nm) and 1.55 $\mu$m (1550 nm).

The dotted line 10 in FIG. 2 shows the typical response over wavelength of the conventional fiber optic coupler illustrated in FIG. 1A in which none of the fibers are pretapered. While the coupled power ratio is 0.5 at 1.3 $\mu$m and 1.55 $\mu$m wavelengths, a slight variation in the wavelength signal causes a large variation in the coupled power and one output signal becomes much larger than the other. The dotted line 11 illustrates the improved wavelength response of the broadband fiber optic coupler with a pretapered fiber twisted with an untapered fiber, illustrated in FIG. 1B. The coupled power ratio is much flatter than that of the conventional coupler. Still flatter is the solid line 12, which illustrates the response of a fiber optic coupler in accordance with the present invention.

An appreciation of the present invention and its merits may be reached by an understanding of the underlying operation of a fiber optic coupler. The coupled power ratio, P, from one fiber to another in a fiber optic coupler is given by the following equation:

$$P = P_o \sin^2\left\{\sqrt{K^2 + \left(\frac{\Delta\beta}{2}\right)^2}\, L\right\} \quad (1)$$

where $P_0$, the peak of the coupled power, is equal to $$P_o = \frac{K^2}{K^2 + \left(\frac{\Delta\beta}{2}\right)^2} \quad (2)$$

and $\Delta\beta$ is the difference in the propagation constants in the two optical fibers. K, the average coupling coefficient between the two fibers, is defined by the following equation:

$$K = \frac{1}{L}\int_o^L C(z')dz' \quad (3)$$

where C(z') is the local coupling coefficient between the two fibers and L is the coupling length.

One way of affecting the coupled power ratio is to mismatch the diameters of the cores of the optical fibers. This may be done by using two optical fibers with different core diameters or by pretapering one of two identical optical fibers. By doing so, there is a difference, $\delta\beta$, in the propagation constants of the two optical fibers. This difference in propagation constants between the two optical fibers leads to an incomplete power transfer between the two fibers and the coupled power ratio is changed.

Figure 3:
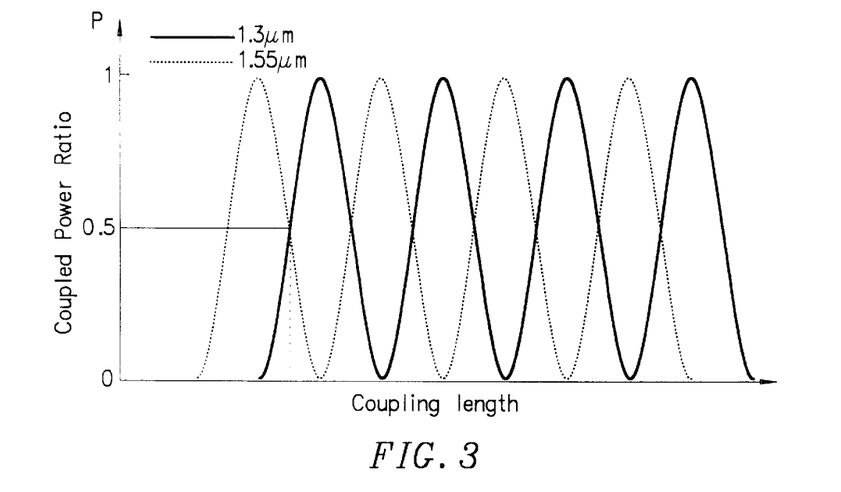
FIG. 3 is a representative graph of the coupled power ratio versus the coupling length for standard couplers illustrated in FIG. 1A.

FIG. 3 is a graph of equation (1), the coupled power ratio versus the coupling length, L, for a standard fiber optic coupler (FIG. 1A) for two wavelengths, 1.3 $\mu$m and 1.55 $\mu$m. The core diameters of the two fibers are identical, i.e., $\Delta\beta$=0 and equation (1) reduces to $P=\sin^2 KL$. The coupled power varies widely with the coupling length L of the coupler. For a coupled power ratio of 0.5, a coupling length, L0. 5, is selected so that coupled power is split evenly, i.e., 0.5, at both wavelengths. The curves for the coupled power ratios for both wavelengths are very similar except for a shift along the axis of the coupling length L. From the steepness of the curves it is also evident that any variation of the wavelength of the signal from either of the two wavelengths causes a marked variation in the coupled power ratio.

Figure 4:
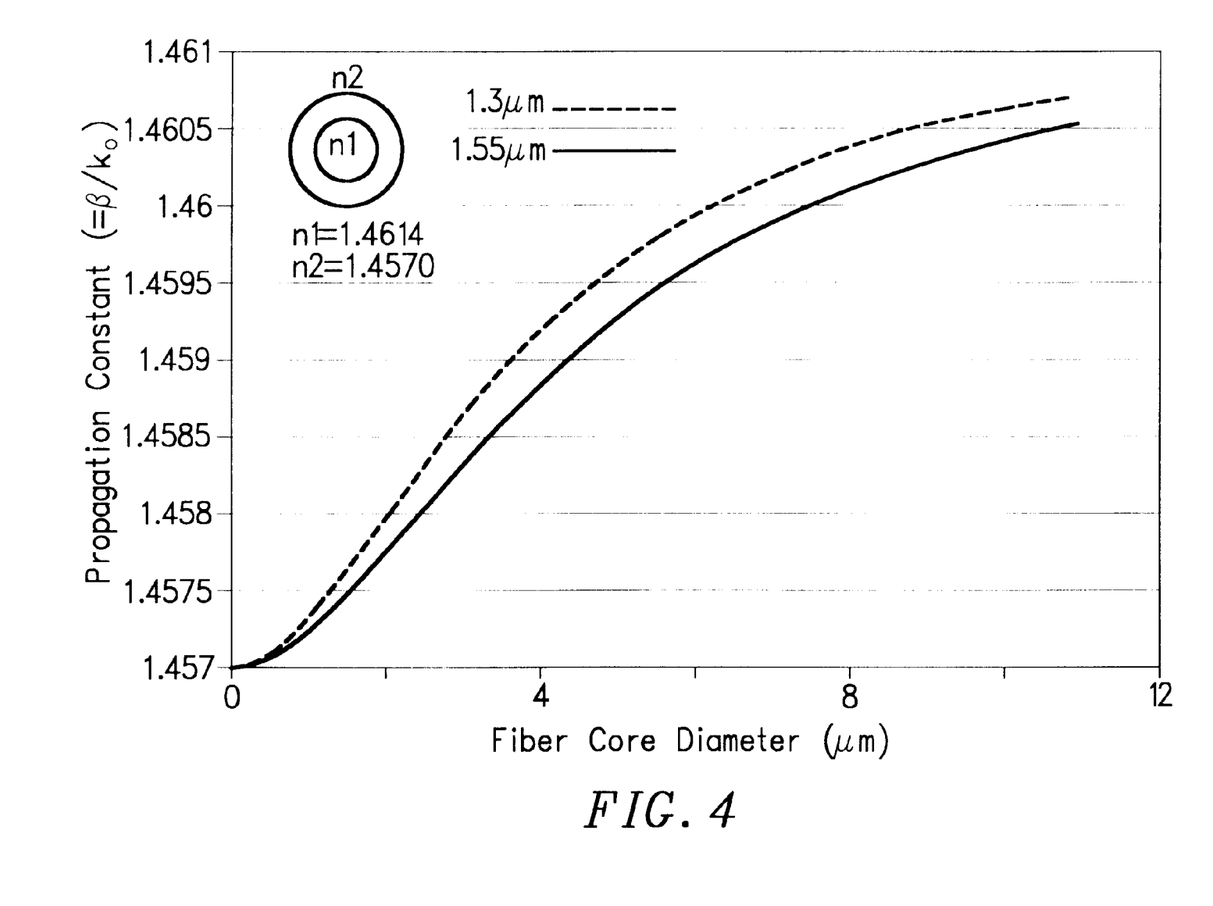
FIG. 4 illustrates the relationship between an optic fiber core diameter and the propagation constant.

By changing the core diameter of one of the two fibers, a mismatch in the propagation constants is created. FIG. 4 shows the relationship between the propagation constant and the core diameter of an optic fiber with particular indices of refraction, n1 and n2, for the core and cladding for the two signal wavelengths. One conclusion from this graph is that the smaller the core diameter of a pretapered fiber, the larger the difference of the propagation constants, A#, of the two fibers. From equation (1) above, the larger the difference, the smaller the power transfer.

Figure 5A:
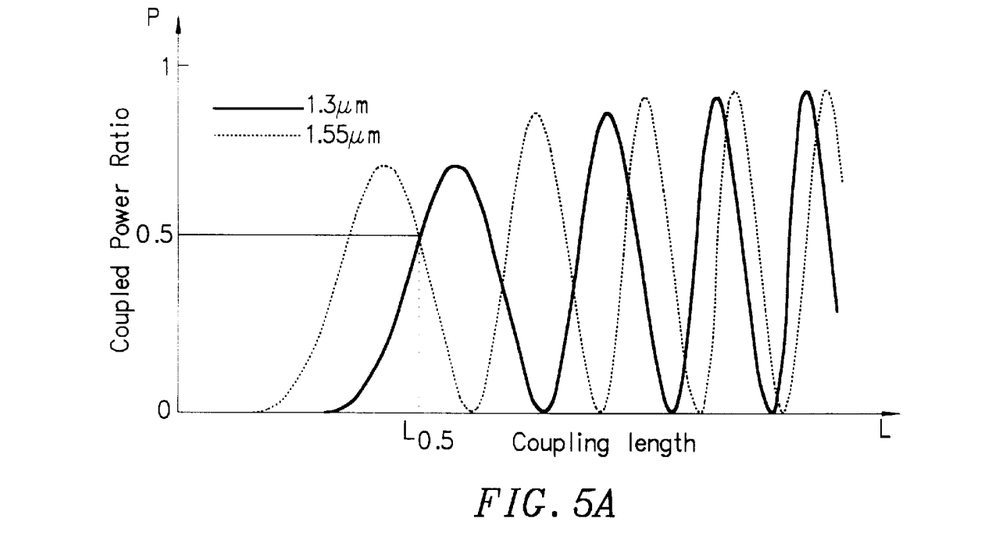
FIGS. 5A–5C are representative graphs of the coupled power ratio versus the coupling length in fiber optic couplers with pretapered fibers having different core diameters.
Figure 5B:
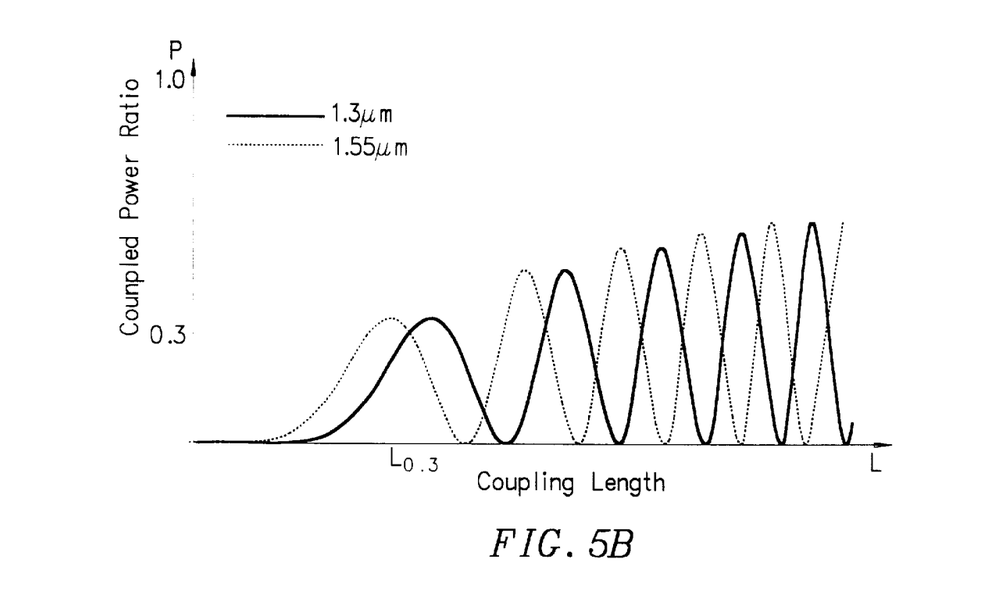
Figure 5C:
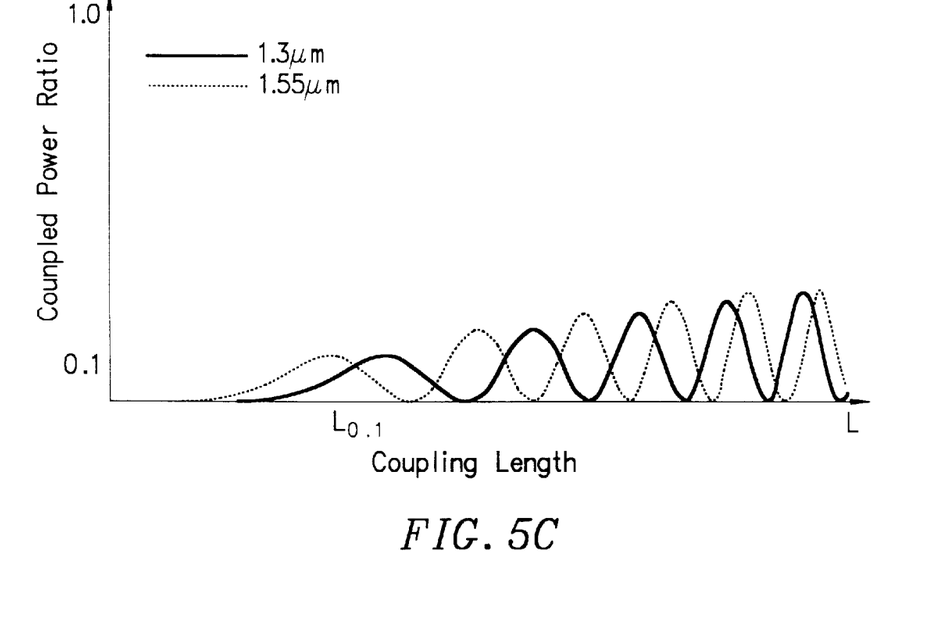

FIGS. 5A-5C are graphs of equation (1), the coupled power ratio versus the coupling length, L, for a standard fiber optic coupler for two wavelengths, 1.3 Am and 1.55 Am. These figures show different coupled ratios, 50% (0.5), 30% (0.3) and 10% (0.1) at selected coupling lengths, $L_{o_{.5}}$, $L_o$ .3 and Lo , respectively, realized by different pretapered fiber core diameters. In FIG. 5A the pretapered fiber has a core diameter, Dl, which is reduced by a predetermined amount of from the nominal diameter, DO. In FIG. 5B the core diameter, D2, is significantly reduced from the diameter Dl, and in FIG. 5C the core diameter D3 is smaller that D2. Thus the coupled power falls from 0.5 in FIG. 5A to 0.1 in FIG. 5C.

From the graphs of FIGS. 3 and 5A-5C, it is evident that as the variability of coupled power ratio with respect to the coupling length declines, the sensitivity of the coupled power ratio to variations in the light signal wavelength from 1.55 Am and 1.3 Am also declines. Thus a flattening of the coupled power ratio curve versus the coupling length leads to a flattening of the coupled power ratio versus the wavelength of light signal. In other words, as the variation of the coupled power ratio to the coupling length diminishes, the variation in the coupled power ratio with respect to the wavelength of the light signal also becomes less sensitive. The broadband couplers illustrated in FIGS. 1B and 1C take advantage of this relationship by a pretapering one of the fibers to create the difference in propagation constants.

Through present invention, a fiber optic coupler is obtained with signal wavelength insensitivity greatly improved over previous broadband couplers by using both the effects of coupling between unmatched optical fibers and of the coupling length between the fibers. Stated more precisely, the present invention recognizes the interplay between the difference in propagation constants of the optical fibers and the coupling length in forming a fiber optic coupler which is substantially independent of wavelength. Besides the difference in the propagation constants, $\Delta\beta$, the coupled power ratio can also be controlled by the coupling length, L, in terms of both the variability of the coupled power ratio with respect to L, and the amplitude, the peak value $P_0$.

Figure 6:
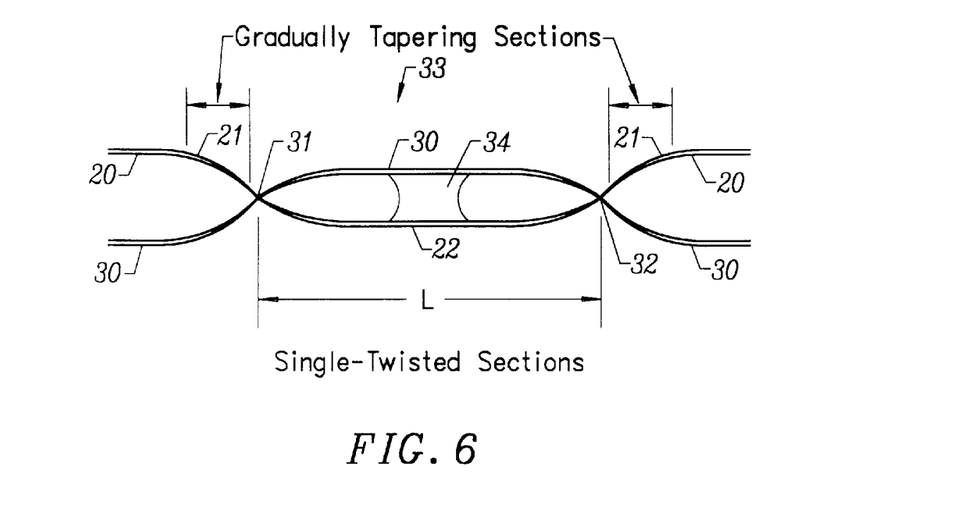
FIG. 6 is a representative diagram of a fiber optic coupler according to the present invention.

According to equation (3) above, K is the average coupling coefficient over the coupling length, L. The present invention controls K in an optical coupler, as shown in FIG. 6, a representational view of an embodiment of the present invention. A first single mode optical fiber 20 is pretapered with two gradually tapering portions 21 and a center portion 22 in which the core and cladding is substantially reduced, but uniform. The center portion 22 is twisted about a section of an untapered single mode fiber 30 to form two "twists" 31 and 32 separated by a central section 33 in which the two fibers 20 and 30 are parallel to each other. The two fibers are fused in part 34 of the central section 33. In FIG. 6 the two fibers 20 and 30, including the central section 33, are illustrated as displaced from each other. This better contrasts the two twists 31, 32 and the separating central section 33. In reality the two fibers 20 and 30 are in contract with each other.

Figure 7A:
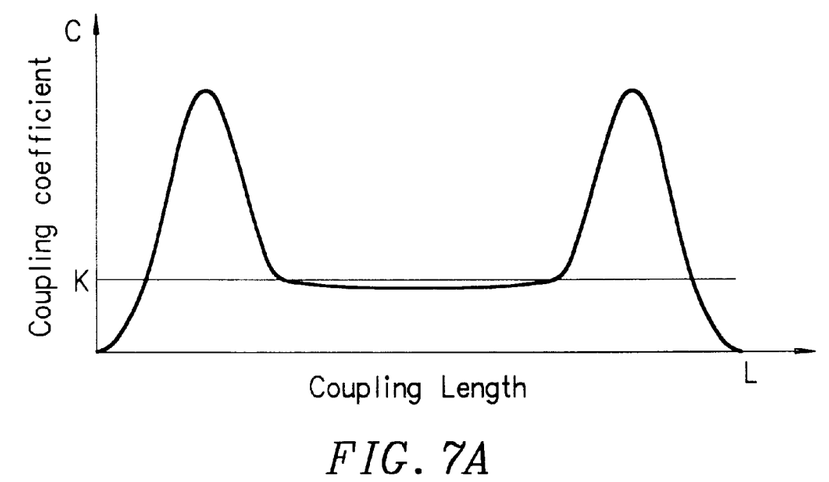
FIG. 7A is a representative graph showing the local coupling coefficient versus the coupling length for the coupler in FIG. 6.

The coupler of FIG. 6 has a controllable average coupling coefficient K due to the selectable distance between the two twists 31 and 32. The local coupling coefficient, C, falls rapidly with the distance, d, separating the cores of the two fibers with the relationship, C $-\alpha$ exp($\alpha$d). The local coupling coefficient in the central section 33 is much smaller than the local coupling coefficient in the twisted area. Any twist apparently tightly couples the two cores of the fibers together. The graph in FIG. 7A shows the local coupling coefficient over a coupling length L. At the two ends the local coefficient rises sharply indicative of the close coupling of the two fiber cores created by the two twists 31 and 32.

Figure 7B:
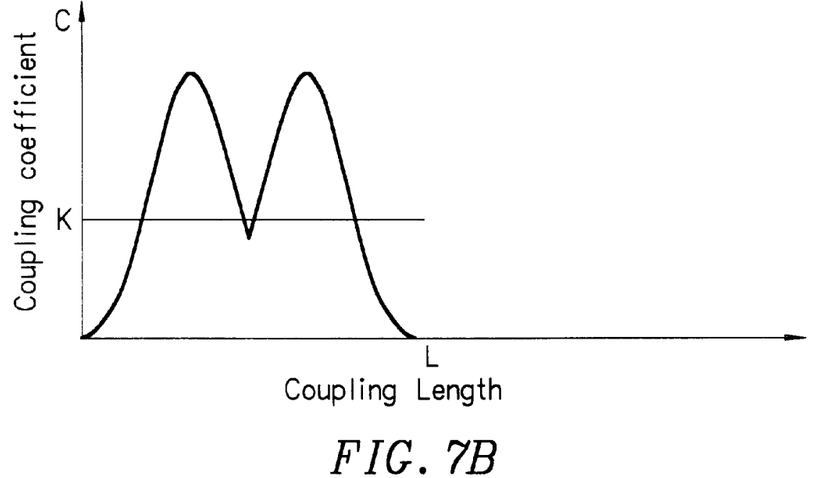
FIG. 7B is a representative graph showing the local coupling coefficient versus the coupling length for the coupler in FIG. 1B.

For comparison, the local coupling coefficient for the coupler of FIG. 1B with only twists is illustrated by a graph in FIG. 7B. In the coupler the two twists are close together. It is evident that K, the average coupling coefficient, is smaller in FIG. 7A than in FIG. 7B from the low coupling in the central section 33. Since the coupled power ratio of equation (1) is a function of the form, $\sin^2\gamma x$, then P is varies less widely than with the coupling length L if $\gamma$ is smaller. In fact, $\gamma$ is:

$$\sqrt{K^2 + \left(\frac{\Delta\beta}{2}\right)^2}$$

With $\Delta\beta$ fixed, K can be lowered to decrease the variability of the coupled power ratio with respect to the coupling length L.

Figure 8:
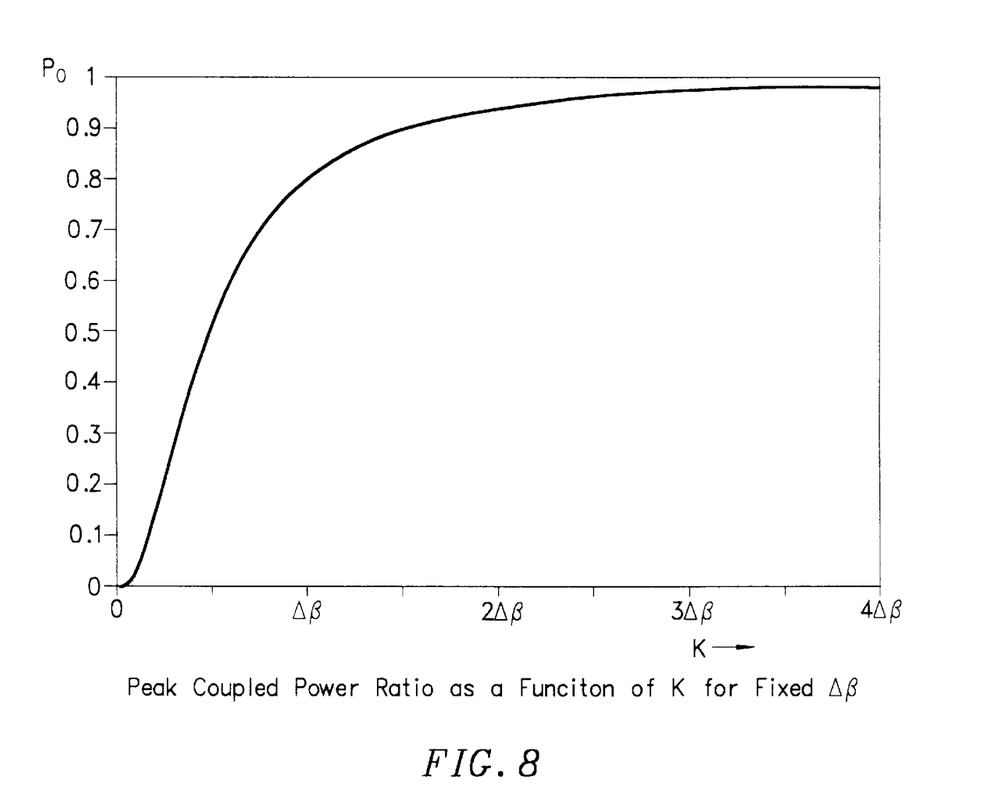
FIG. 8 shows the peak coupled power ratio $P_0$ has a function of K for a fixed difference in propagation constants, $\Delta\beta$.

From equation (2), the average coupling coefficient K can also be used to control coupled power peak $P_0$. FIG. 8 shows that when $\Delta\beta$ is fixed, the peak of the coupled power, $P_0$, is a function of K. Thus, it can be seen that for $0<K<\Delta\beta/2$, one can achieve any coupling ratio between 0% and 50%. By adjusting the coupling length L, the present invention allows the coupled power ratio to be controlled in terms of 1) the variability of the coupled power ratio with respect to L and 2) the peak value $P_0$.

In practice, a fiber optic coupler according to the present invention is manufactured by the following procedure for two identical optical fibers 20 and 30, preferably single mode optical fibers having cladding diameters of 125 $\mu$m. A 7 mm portion of the fiber 20 is pretapered by being heated and pulled slowly apart. The portion 22 with a narrowed diameter and portions 21 in which the narrowed diameter of the portions 22 gradually increases into the nominal diameter of the fiber 20 are formed. The narrowed portion 22 has a cladding diameter of approximately 110 $\mu$m (and corresponding narrowed core diameter) and a length of approximately 5 mm between the two gradually tapering portions 21.

Figure 9A:
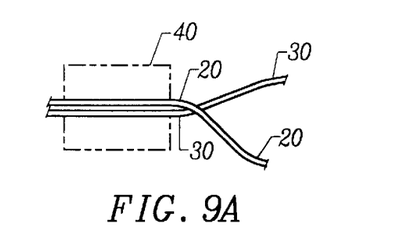
FIGS. 9A–9D illustrate the steps in manufacturing the fiber optic coupler illustrated in FIG. 6.

Then the two fibers 20 and 30 are held together by clamp 40 in parallel and the first "twist" 31, really a half-twist, is formed by crossing the two fibers as shown in FIG. 9A. The clamp 40, indicated by a dotted rectangle, is a vacuum clamp which holds the fibers without damage. Of course, while reference is made to the fiber 20, it is specifically the narrowed portion 22 of the fiber 20 which is being manipulated.

Figure 9B:
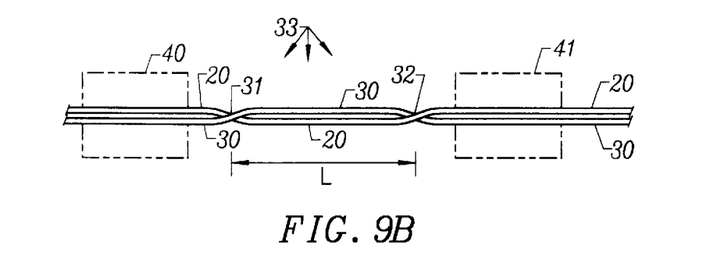

The second twist 32 is formed by crossing the two fibers 20 and 30 again. At this point the two twists 31 and 32 form one full twist. The free ends of the fibers are then held together by a second vacuum clamp 41, as shown in FIG. 9B. The two twists 31 and 32, forming the central section 33, are approximately 5.7 mm apart without any tension to maintain the arrangement of the fibers 20 and 30.

Figure 9C:
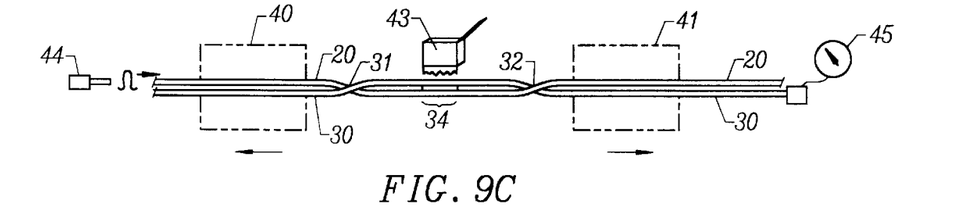

A gas torch 43 is brought into close proximity to the central section 33. Only a part 34 of the central section 33 is heated as indicated in FIG. 9C. A torch, such as described in U.S. Ser. No. 08/004,041, entitled, "A TORCH FOR MANUFACTURE OF OPTICAL FIBER COUPLER AND METHOD OF MANUFACTURE," filed of even date as the present application by J. J. Pan, Ming Shih, Z. M. Mao, Frank Y. F. Liang, and K. Shih, and assigned to the present assignee, has been found to be particularly efficacious in performing this heating step.

As the two fibers 20 and 30 in the central section 33 fuse, the clamps 40 and 41 are driven apart slowly to place the fibers under tension. As this step is being performed, a laser source 44, which has been connected to one of the two fibers, say the fiber 20, sends light into the central section 33. A power meter 45, connected to the other fiber 30 on the opposite side of the central section 33, monitors the output of the light to the fiber 30 to determine the coupled power ratio in situ. When the desired power is indicated by the power meter 45, the torch 43 is withdrawn and the motion of the fiber clamps 40 and 41 is stopped.

Figure 9D:
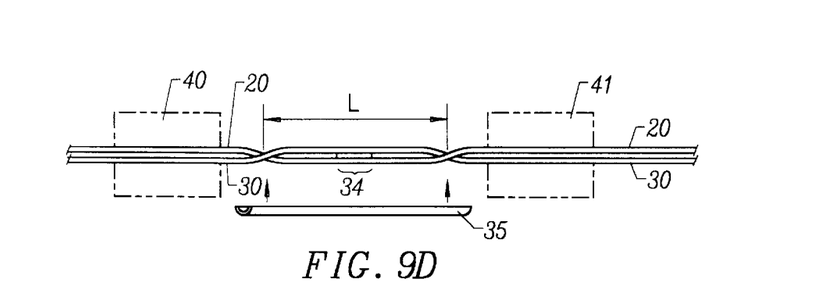

While the fibers 20 and 30 are held in place by the clamps 40 and 41, a preform 35, a half-cylinder of quartz, receives the fibers 20 and 30, as indicated in FIG. 9D. A quick-setting, thermally cured epoxy, such as Epo-Tek 353 ND from Epoxy Technology, Inc. of Bellerica, Mass., is placed over the fibers in the preform 35 and cured thermally. After curing, the clamps 40 and 41 release the fibers. Finally, the preform 35 and the fibers are inserted into a protective prepackage in the form of a hollow quartz cylinder. UV(ultraviolet)-cured epoxy, such as ELC 4481 from Electro-lite Corp. of Danbury, Conn., is applied at the ends of the prepackage 35. After UV light is applied to cure the epoxy, the entire assembly is placed in a coupler package (not shown).

In the completed coupler assembly the coupling length L determined by the distance between the twists 31 and 32. The twists 31 and 32 provide the tight contact between the two fibers 20 and 30 to assure a reliable coupling between the two optical fibers. In fact, it is believed that the principal reason why couplers of the type shown in FIG. 1C have been found to be difficult to manufacture and performance difficult to predict and to reproduce in a reliable manner is that parallel juxtaposition of fibers, even with fusion, does not provide the certain coupling demanded in a reliable and predictable manufacturing process.

With the present invention, a fiber optic coupler can be manufactured reliably and predictably with very high performance. Excess loss of less than 0.05 dB at 1.3 $\mu$m wavelengths and 0.04 dB at 1.55 $\mu$m wavelengths have been achieved. Furthermore, any coupled power ratio can be selected. As explained above, the torch 43 is removed and the drive of the clamps 40 and 41 is terminated when the desired coupled power ratio is reached. Any ratio between 0 and 0.5 is possible. Thus the present invention allows for the flexible determination of the distribution of power of an incoming light signal to its two output fibers.

While the above is a complete description of the preferred embodiments of the present invention, various alternative, modifications and equivalents may be used. It should be evident that the present invention is equally applicable by making appropriate modifications to the embodiments described above. Therefore, the above description should not be taken as limiting the scope of the invention which is defined by the metes and bounds of the appended claims.

What is claimed is:

1. A fiber optic coupler of first and second optic fibers, each optic fiber having a core and a cladding, said coupler comprising:

a length of said first and second optic fibers, said first optic fiber along said length having a different propagation constant than that of said second optic fiber, said length having two ends, said first and second optic fibers twisted together at each end and substantially parallel to each other between said two ends;

a portion of said length of said first and second optic fibers fused between said first and second ends, said fused portion disposed between and separated from said first and second twists;

whereby an input light signal to said coupler is split into output light signals in a predetermined coupled power ratio on said first and second optic fibers, said power ratio relatively insensitive for a predetermined range of wavelengths of said input light signal.

2. The fiber optic coupler of claim 1 wherein said first and second optic fibers are twisted together at each end by a half-twist.

3. The fiber optic coupler of claim 1 wherein said coupled power ratio is substantially 0.5.

4. The fiber optic coupler of claim 1 wherein said first and second optic fibers having a nominal cladding diameter of 125 micrometers, and said first optic fiber has a cladding diameter of approximately 110 micrometers along said length.

5. The fiber optic coupler of claim 4 wherein said length is substantially 5.7 millimeters.

6. The fiber optic coupler of claim 1 wherein said length of said fibers is held by a half-cylinder of quartz.

7. The fiber optic coupler of claim 6 wherein said fibers are fixed to said half-cylinder by epoxy.

8. The fiber optic coupler of claim 7 wherein said epoxy is thermally cured.

9. The fiber optic coupler of claim 1 wherein said first optic fiber along said length has a different core diameter than that of said second optic fiber.

10. A method of manufacturing a fiber optic coupler comprising:

providing first and second optical fibers, said optical fibers having mismatched propagation constants;

forming said fibers into two twists separated by a substantially parallel section of said fibers;

heating a portion of said parallel section to fuse said heated portion of said fibers, said heated portion being disposed between said two twists and separated from said two twists;

pulling said fibers as said heated portion of said fibers are fused; and stopping said fusing and pulling steps when a predetermined coupled power ratios is reached;

whereby a fiber optic coupler having a coupled power ratio relatively insensitive for a predetermiend range of signal wavelengths.

11. The method of claim 10 wherein said providing step comprises selecting fibers having differing core diameters.

12. The method of claim 11 wherein said providing step comprises pretapering one of two fibers.

13. The method of claim 10 wherein said forming step comprises placing said fibers into a first clamp;

forming a first twist with said fibers;

forming a second twist displaced a predetermined distance away from said first twist, said fibers being substantially parallel with each other between said first and second twists; and placing said fibers into a second clamp so that said first and second twists are positioned between said clamps.

14. The method of claim 13 wherein said first twist forming step comprising crossing said fibers to form a half-twist.

15. The method of claim 13 wherein said second twist forming step comprising crossing said fibers to form a half-twist.

16. The method of claim 13 wherein said pulling step comprises driving said first and second clamps apart slowly.

17. The method of claim 10 wherein in said heating step a gas torch heats said part substantially equidistant from said first and second twists.

18. The method of claim 10 further comprising placing a light signal into an end of one of said fibers; and monitoring said light signal on any one of said fibers opposite said end to determine the coupled power ratio in situ.

19. The method of claim 18 wherein said predetermined coupled power ratio is 0.5.

20. The method of claim 10 further comprising placing said fibers into a preform so that said first and second twists and said parallel section are held in said preform; and bonding said first and second twists and said parallel section to said preform.

21. The method of claim 20 wherein said preform comprises a half-cylinder of quartz.

22. The method of claim 21 wherein said bonding step comprises applying epoxy over said first and second twists and said parallel section in said preform and curing said epoxy.

23. The method of claim 22 further comprising releasing first and second clamps after said epoxy is cured.

24. A method of manufacturing a fiber optic coupler comprising:

providing first and second optical fibers having mismatched propagation constants;

forming said fibers into two twists separated by a parallel section;

heating a portion of said parallel section disposed between said two twists;

pulling said portion while heating said portion of said section so as to vary a coupling length extending along said portion, said heated portion being separated from said two twists so as to inhibit variation in coupling co-efficients along said twists when said portion is pulled;

placing a light signal into an end of one of said fibers; and monitoring said light signal on any one of said fibers opposite said end during the heating and pulling steps.

25. A fiber optic coupler manufactured according to the method of claim 24.

* * * * *

UNITED STATES PATENT AND TRADEMARK OFFICE
CERTIFICATE OF CORRECTION

PATENT NO. : 6,148,129

DATED : November 14, 2000

INVENTOR(S) : Pan et al

It is certified that error appears in the above-identified patent and that said Letters Patent is hereby corrected as shown below:

Col. 4, line 57, "Am:" should read -- $\mu$ m --

Col. 4, line 58, "Am:" should read -- $\mu$ m --

Col. 5, line 5, "Am" should read -- $\mu$ m -- twice

Signed and Sealed this

First Day of May, 2001

Attest:

NICHOLAS P. GODICI

*Attesting Officer*     *Acting Director of the United States Patent and Trademark Office*